United States Patent [19]
Manuel et al.

[11] 3,742,937
[45] July 3, 1973

[54] CARDIAC MONITOR

[76] Inventors: Barry Manuel, Lockeland Road, Winchester, Mass. 01890; Harvey L. Pastan, 60 Shaw Road, Chestnut Hill, Mass. 02167

[22] Filed: Jan. 20, 1971

[21] Appl. No.: 107,959

[52] U.S. Cl.... 128/2.05 T, 128/2.05 E, 128/2.05 P, 128/2.06 A
[51] Int. Cl............................................. A61b 5/02
[58] Field of Search.................. 128/2.05 E, 2.05 P, 128/2.05 R, 2.05 T, 2.06 A, 2.06 F, 2.06 R, 2 R

[56] References Cited
UNITED STATES PATENTS

| | | | |
|---|---|---|---|
| 3,442,263 | 5/1969 | Pascaud | 128/2.05 P |
| 2,907,320 | 10/1959 | De Weese et al. | 128/2 R |
| 2,756,741 | 7/1956 | Campanella | 128/2.05 T |
| 3,491,750 | 7/1970 | King | 128/2.06 R |
| 3,518,983 | 7/1970 | Jorgensen | 128/2.06 A |
| 3,599,628 | 8/1971 | Abbenante et al. | 128/2.06 F |

*Primary Examiner*—William E. Kamm
*Attorney*—Wolf, Greenfield & Sacks

[57] ABSTRACT

The monitoring device is self-contained, compact and is preferably strapped about the wrist over the region where a radial pulse is normally detected. Heart rate and abnormalities in the heart beat rate are sensed by the device. Because no external connections are necessary to a power source, for example, the device is particularly useful for ambulatory patients suffering from various types of heart ailments.

A pressure sensitive diaphragm sensor is held against the skin over the radial pulse region to sense the pulse wave transmitted from the heart. This pressure sensor couples to a mechano-electrical transducer which converts the pressure pulse into an electrical analog pulse. A multivibrator, or the like, couples from the transducer and is used to square (digitize) the analog pulse. Logic circuitry receives a digital heart pulse from the multivibrator and is adapted to detect when the heart rate is either below a minimum predetermined rate or above a maximum predetermined rate. When either of these conditions exists an alarm signal is generated. Circuitry may also be included for those patients who may be expected to experience irregularities of the heart beat. This circuitry determines when heart beats have been dropped, for example.

4 Claims, 14 Drawing Figures

INVENTORS
BARRY MANUEL
BY HARVEY L. PASTAN
WOLF, GREENFIELD & SACKS

CARDIAC MONITOR

FIELD OF THE INVENTION

The present invention relates in general to a device for monitoring the beat of the human heart. More particularly, the present invention is concerned with a cardiac monitor that senses the heart beat and is adapted to cause an alarm condition when the heart rate is either too fast, too slow, or irregular. The device of this invention can be constructed compactly and thus is preferably used by ambulatory heart patients suffering from various types of heart ailments.

BACKGROUND OF THE INVENTION

Nowadays there are many patients suffering from heart disease who have conduction problems; that is, problems of transmitting the electrical impulse from the sinus node of the heart to the ventricle. To aid these patients a cardiac Pacemaker (Registered Trademark) is surgically placed in the body. Some of the Pacemakers are of the demand-type which are designed to provide a rate that is adequate for the particular activities of the patient. One of the problems in implanting Pacemakers has been the occasional failure or premature discharging of the batteries associated with the Pacemaker, which are also implanted beneath the skin of the patient. When a battery failure does occur it is sometimes difficult for the patient to recognize the malfunction until a major catastrophe has occurred.

Hospitals are provided with testing devices for monitoring heart rate. However, usually these devices are quite bulky. The real problem associated with these essentially stationary testing devices is that they are intrusive and are not adapted to be worn by the patient outside of the hospital.

OBJECTIVES OF THE INVENTION

One important objective of the present invention is to provide an improved cardiac monitor that senss when the rate of beat of the heart is either below a predetermined minimum value or above a predetermined maximum value. These minimum and maximum rates would be determined by the patient's physician who would consider such factors as the particular ailment involved and the past history of the patient.

Another important objective of the present invention is to provide an improved cardiac monitor that senses abnormalities or irregularities in the rate of the heart beat such as the heart dropping one or more beats, or the occurrence of double heart beats (multiple premature beats occurring either singularly or in a run).

Another objective of the present invention is to provide a cardiac monitor that employs a pulsed light source which is visible to the patient and which is repetitively activated by each heart beat when the patient wants an immediate indication of his present heart rate.

A further objective of the present invention is to provide a cardiac monitor that is self-contained, preferably strapped about the wrist like a wristwatch, and is relatively light in weight and compact.

SUMMARY OF THE INVENTION

According to the present invention, the cardiac monitor attaches to an appropriate point on the patient's body such as a pressure point where the pressure pulses transmitted from the heart can be sensed. In a preferred embodiment of the invention the cardiac monitoring device is strapped about the patient's wrist like a wristwatch, and is adapted to generate an alarm indication when the heart beat rate is less than a minimum predetermined value, more than a maximum predetermined value, or when the heart beat rate occurs at abnormal intervals. This device is quite useful for an ambulatory patient with an implanted Pacemaker, especially when the patient is not near a hospital or doctor. The patient would be alerted as soon as his pulse rate went above or below the predetermined levels, which levels would be preset by his physician. Should such an alarm condition occur, the patient would immediately contact the physician so that appropriate correction can be made before any serious injury occurs.

In accordance with another aspect of the present invention, the device monitors abnormal activities of the heart. It is well known that people under severe stress manifest this stress in a number of ways concerning heart functioning. For example, the heart may occasionally either drop a beat or produce a double beat. The cardiac monitor is thus preset for patients expected to exhibit this type of arythmia so that an alarm indication occurs when a certain number of irregularities are detected within a given time period.

A cardiac monitor constructed according to this invention basically includes a pulse pressure sensor, a mechano-electric transducer and alarm circuitry including logic circuitry. The pressure sensor may be a strain gauge sensor or a variable capacitance sensor. It is preferred that the sensor be more sensitive to pressure changes of the type normally monitored from the heart, and not be sensitive to slow pressure variations. The mechano-electric transducer couples to the pressure sensor and converts the sensed pressure pulse into an electrical analog pulse. In the disclosed embodiment the mechano-electric transducer includes a known circuit that operates using a differential pulse-width modulation scheme, and a low-pass filter that smooths the pulsed output to an analog output signal. A monostable multivibrator or Schmitt trigger circuit may then be coupled from the mechano-electric transducer to provide a digitized (square) output of controlled width. Logic circuitry couples from the digital output of the monostable multivibrator and is adapted to generate an alarm signal when the rate of the heart beat is below a minimum predetermined rate or above a maximum predetermined rate. This alarm signal (digital level) may then be fed to a conventional alarm.

In accordance with another aspect of this invention, the cardiac monitoring device may include alarm circuitry for detecting abnormal functioning of the heart. This circuitry may include a complementing flip-flop that is set and reset on alternate heart pulses. Additional circuitry connects to the output of the flip-flop and essentially measures the time that the flip-flop is in each state. When the heart is operating normally the flip-flop should be in each state for approximately equal amounts of time. When one or more beats are dropped, for example, the output circuitry detects this condition, as the flip-flop will remain in one of the two states longer, and an alarm indication is generated.

BRIEF DESCRIPTION OF THE DRAWINGS

Numerous other aspects of this invention along with additional objectives, features and advantages of the invention should now become apparent upon a reading of the following exposition in conjunction with the accompanying drawings in which.

EXPOSITION

Figure 1:
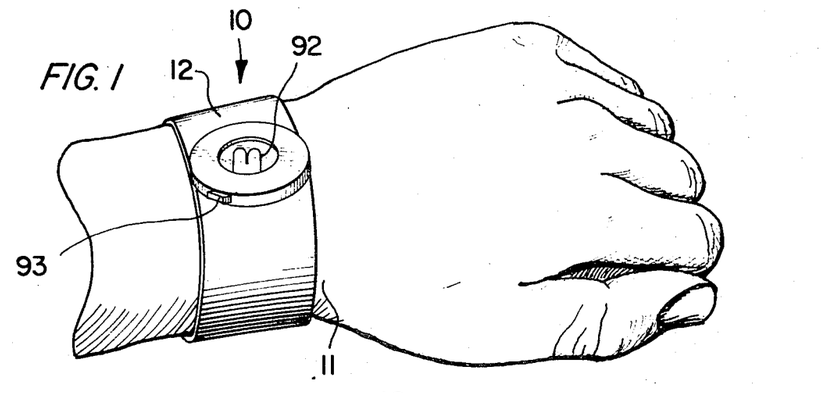
FIG. 1 shows a cardiac monitor of this invention attached to the patient's wrist to monitor radial pulses.

Referring now to the drawings, and in particular to FIG. 1, there is shown a cardiac monitor 10 constructed in accordance with this invention and strapped by suitable means about the wrist 11 of the patient. The cardiac monitor 10 may include most of the circuitry shown in the block diagram of FIG. 2. The strap 12 extends about the entire wrist. In FIG. 1 the radial pulse area of the wrist is not shown. However, the strap 12 is used to hold a pressure sensor against the radial pulse region in order to sense pressure pulses transmitted from the heart.

Figure 2:
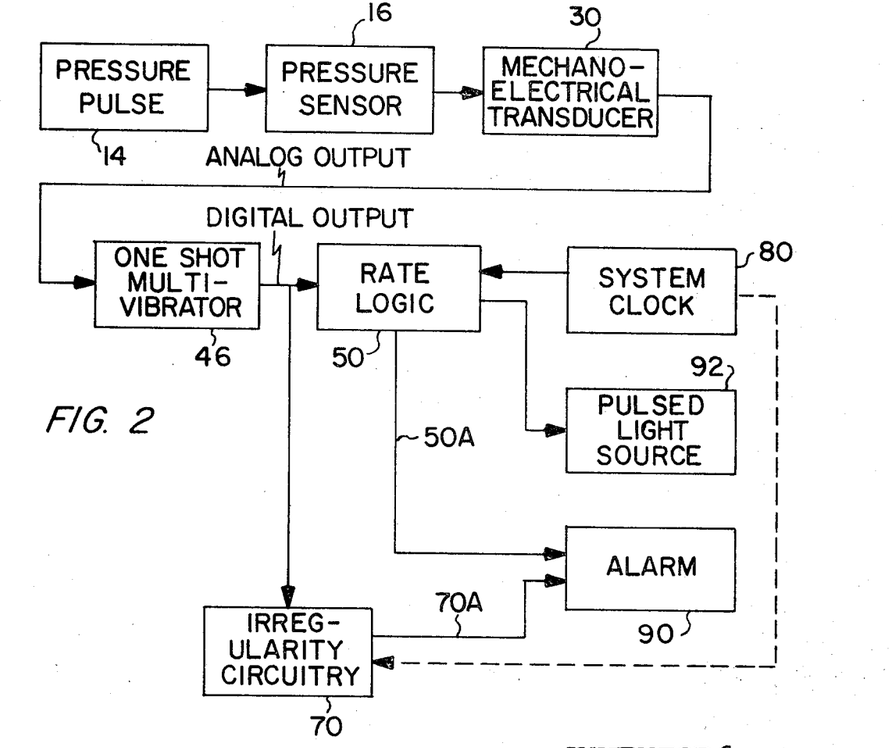
FIG. 2 is a block diagram of a cardiac monitoring device constructed in accordance with the principles of the present invention.
Figure 3:
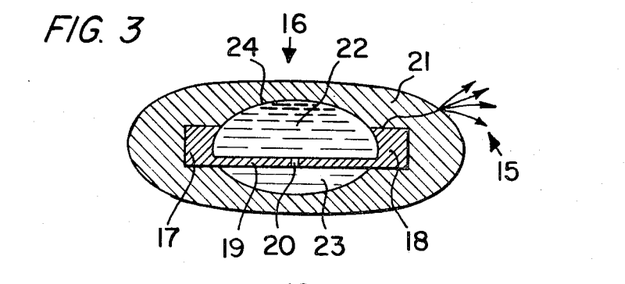
FIG. 3 is an enlarged cross sectional view of one embodiment of a pressure sensor.
Figure 4:
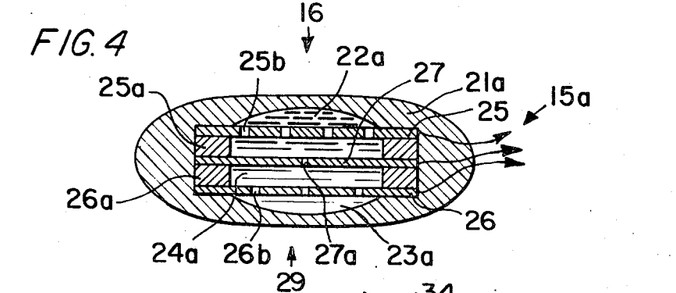
FIG. 4 is an enlarged cross sectional view of a preferred embodiment of a pressure sensor.

A logic block diagram of one embodiment of the cardiac monitor is shown in FIG. 2. The sensed pressure pulse is represented by the block 14. This pressure pulse is also depicted in FIG. 5B. The pressure pulse is coupled through the patient's skin to the pressure sensor 16, two separate embodiments of which are shown in FIGS. 3 and 4, and discussed in more detail hereafter. One or more output connections from pressure sensor 16 couple to mechano-electric transducer 30 which converts the sensed pressure pulse into an electrical analog pulse that is representative of the pressure pulse. In the disclosed embodiment of FIG. 5A the mechano-electric transducer includes a known circuit that operates using a differential pulse-width modulation scheme, and a low-pass filter that smooths the pulse output to the analog output signal. The output of transducer 30 couples to monostable multivibrator 46 whose output provides a digitized (squared) voltage output of controlled width. The output of multivibrator 46 may be referred to as the digital heart output. It is this output that is processed by the alarm circuitry of FIG. 2.

The alarm circuitry includes rate logic 50, irregularity circuitry 70, a system clock 80, and an alarm 90. Rate logic 50 receives the digital heart output signal from multivibrator 46, and is adapted to generate an alarm signal on output line 50A when the rate of the heart beat is below a minimum predetermined rate or above a maximum predetermined rate. In the illustrated embodiment the system clock 80 provides a negative-going ground pulse every 15 seconds which resets a counter in rate logic 50. (See FIG. 6). Thus, system clock 80 provides timing that enables rate logic 50 to observe heart beats and sense alarm conditions in 15 second intervals. FIG. 2 also shows pulsed light source 92 (see also FIG. 1) which may be activated by a momentary push button 93 and allows the patient to count the light pulses representative of each heart beat during a 15 second interval, to thereby determine visually what his heart rate is at any given time.

The irregularity circuitry 70 of FIG. 2 receives the digital heart pulse from multivibrator 46 and is adapted to determine whether an abnormal functioning of the heart has occurred. For example, the heart may occasionally either drop a beat or produce a double beat. Should a certain number of predetermined irregularities occur within the 15 second interval, for example, irregularity circuitry 70 would generate an alarm signal on output line 70a which is coupled to alarm 90. In FIG. 2 a dotted line is shown from the system clock 80 to irregularity circuitry 70. For some applications this connection is not necessary. The details of circuitry 70 are discussed in more detail with reference to FIG. 9. A logic arrangement for circuitry 70 is depicted in FIG. 10.

In FIG. 1 the cardiac monitor is shown strapped to the patient's wrist and the pressure sensor is held against the radial pulse region. In another arrangement the pressure sensor could surround the patient's finger in order to detect the digital pulse. Alternatively, a special eyeglass frame could be designed to support the pressure sensor so that it could detect the temporal pulse. The device could be worn around the ankle so as to monitor the posterior tibial pulse or around the foot to detect the dorsalis pedis pulse.

FIG. 3 shows one embodiment for a pressure sensor 16 employing semiconductor strain gauges 17. The strain gauges 17 are diffused within silicon diaphragm 18 which may be annular in shape. Diaphragm 18 includes a thin central portion 19 having an orifice 20 centrally disposed therethrough. Silicone rubber capsule 21 surrounds diaphragm 18 and defines chambers 22 and 23 above and below the central portion 19 of diaphragm 18. A silicone oil 24 fills both chambers 22 and 23.

The four strain gauges 17 are connected in a full Wheatstone Bridge configuration with a resistance of between 1000 and 10,000 ohms. The two excitation and two signal connections comprise the four leads 15. With the embodiment of FIG. 3 a relatively powerful battery source is needed to excite the strain gauges 17. The output from the bridge circuit is amplified using a low voltage microwatt powered integrated circuit amplifier such as the Fairchild FuA735C. The amplifier output would be biased to the logic zero state when the differential pressure is zero, and when a minimum pressure pulse is received the output rises to the logic 1 state producing a pulse from a multivibrator connected to the amplifier output. This multivibrator output could then be used as a digital heart pulse.

However, because excess power may be necessary to operate the embodiment of FIG. 3, the pressure sensor of FIG. 4 is a preferred embodiment in accordance with the principles of this invention. The pressure sensor 16 of FIG. 4 is a variable capacitance sensor that includes fixed end plates 25 and 26 which are constructed of a conductive material and may be annular in shape. A conductive pressure sensitive diaphragm 27 is disposed by means of insulating spacers 25a, 26a intermediate fixed end plates 25 and 26. The plates 25 and 26 each have a plurality of comparatively large holes 25b and 26b, respectively, extending therethrough. Diaphragm 27 contains one centrally disposed aperture 27a. A silicon rubber capsule 21a encloses plates 25 and 26, and diaphragm 27, and defines chambers 22a and 23a above and below fixed plates 25 and 26, respectively. A silicone oil 24a fills chambers 22a and 23a, and is also on both sides of diaphragm 27.

Figure 5A:
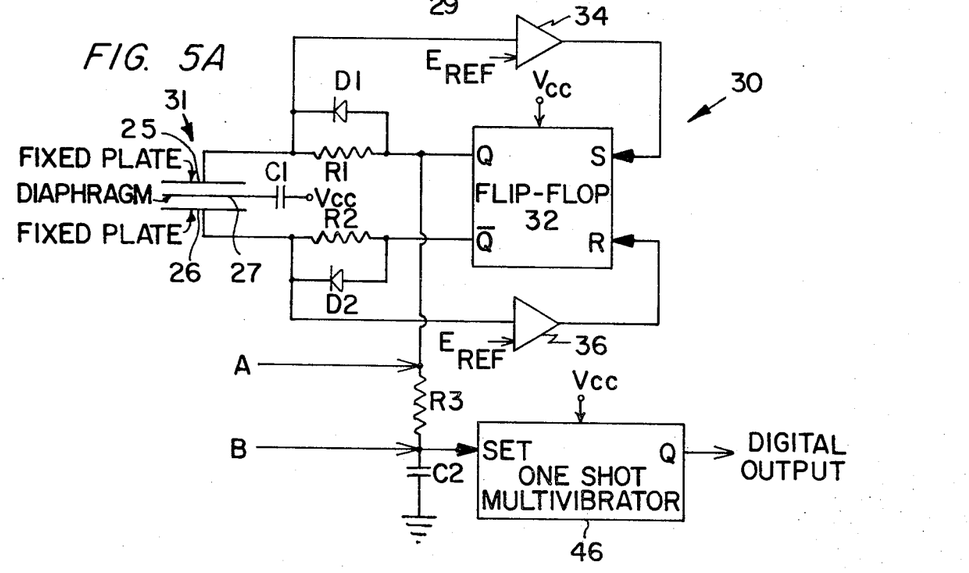
FIG. 5A is a circuit diagram of one embodiment of the mechano-electrical transducer of FIG. 2, including the monostable multivibrator, also shown in FIG. 2.
Figure 5B:
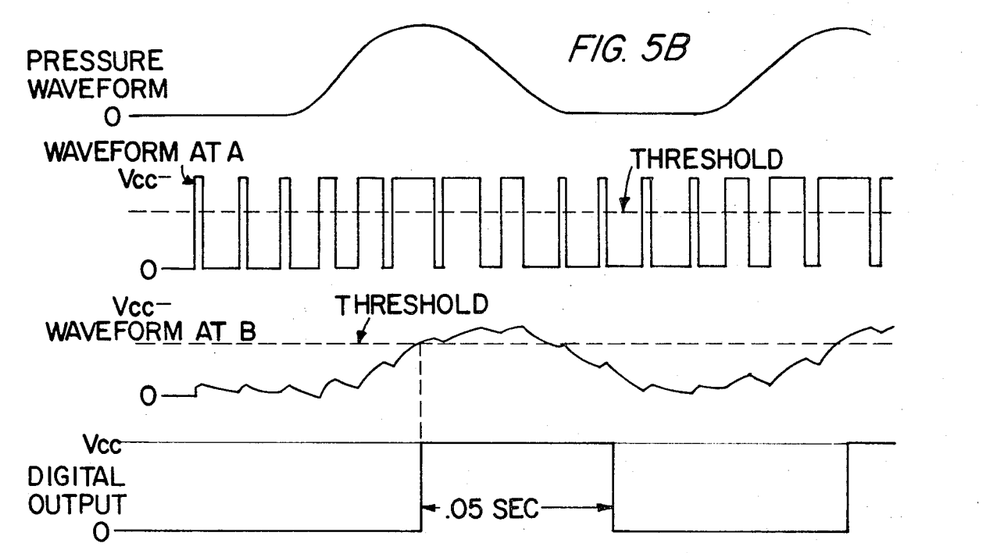
FIG. 5B shows various waveforms associated with different points in the circuit of FIG. 5A.

Three leads 15a connect from plates 25 and 26 and from diaphragm 27 to the circuit shown in FIG. 5A, which schematically shows the capacitor sensor at 31.

FIG. 4 is an enlarged view of the capacitor pressure sensor. In an actual embodiment the diameter of the sensor is between one-fourth inch and one-half inch and may have a thickness of 0.1 to 0.2 inch. This sensor is small enough to be easily mounted immediately over the artery of interest with a comfortable clamping pressure suitable for continuous wearing by the patient.

In FIG. 4 when a pressure pulse is applied in the direction of arrow 29 the diaphragm 27 deflects toward plate 25. Previous to this deflection the capacitance between diaphragm 27 and plate 25 was approximately equal to the capacitance between the diaphragm and plate 26. However, when the diaphragm deflects the capacitance between diaphragm 27 and plate 25 increases and the capacitance between the diaphragm and plate 26 decreases. It is this change in capacitance that is sensed by the circuitry of FIG. 5A.

For the application of this invention it is desirous that a leaky differential pressure sensor which is primarily sensitive only to pressure changes be used. Such a device is provided in the embodiment of FIG. 4 wherein the sensor 16 is eancapsulated in a soft silicone rubber with the diaphragm 27 defining chambers on either side thereof connected only by orifice 27a. Filling both chambers with a low viscosity silicone oil allows coupling of the pressure fluctuations through the chamber walls to the diaphragm. The arrangement of FIG. 4 is also advantageous in that is is not sensitive to slow "steady-state" variations, such as might be caused by shifting the clamping pressure of the device.

It would be possible to make capacitance sensor 16 with one fixed plate only in which case the other plate would be replaced by a fixed capacitor. This scheme results in less output for a given diaphragm deflection but may be useful in certain applications.

The pressure pulse that is capacitively sensed by the pressure sensor of FIG. 4 is converted into an analog voltage proportional to differential pressure by using a differential pulse-width modulation scheme such as that described in U. S. Pat. No. 3,518,536. The circuitry of FIG. 5A is similar to that disclosed in the above mentioned patent. The waveforms of FIG. 5B are associated with the circuitry of FIG. 5A.

The circuitry of FIG. 5A generally includes a capacitive pressure sensor indicated at 31, a flip-flop 32, comparators 34 and 36, and one shot multivibrator 46. Flip-flop 32 is of conventional design and has its Q output coupled by way of resistor R1 and diode D1 to plate 25 of the pressure transducer. The $\bar{Q}$ of flip-flop 32 couples by way of resistor R2 and diode D2 to the other plate 26 of the pressure transducer. The diaphragm 27 is coupled by way of capacitor C1 to the +Vcc power supply. The cathodes of diodes D1 and D2 couple respectively to one input of comparators 34 and 36. The other input to each of the comparators 34 and 36 is an E reference signal which is typically a dc voltage of approximately ½ $V_{cc}$. The outputs of comparators 34 and 36 couple respectively to the set (S) and reset (R) inputs of flip-flop 32.

In operation, flip-flop 32 is alternately set and reset through the charging circuit including comparators 34 and 36, and the capacitance of the pressure transducer. Assuming that the spacing of the diaphragm 27 is halfway between plates 25 and 26 the flip-flop 32 should be in either state equal amounts of time. Thus, when flip-flop 32 is set its Q output is high and its $\bar{Q}$ output is low. A discharge path is provided by way of capacitor C1, plate 26 and resistor R2 to the $\bar{Q}$ output of flip-flop 32. As the voltage on fixed plate 26 decreases comparator 36 is enabled when this voltage reaches the E reference voltage and flip-flop 32 becomes reset. When this action occurs the $\bar{Q}$ output becomes positive and the Q output goes to ground. The discharge path is then through resistor R1 and capacitor C1 until comparator 34 is enabled and the flip-flop 32 then reverts to its set state.

The top waveform of FIG. 5B shows the pressure pulse that deflects diaphragm 27 to alter the capacitance of the pressure transducer. It is also noted in FIG. 5B that the waveform at point A (Q output of flip-flop 32), indicates that flip-flop 32 is in its set state for a shorter time interval than it is in its reset state. This mode of operation can easily be provided by disposing the diaphragm 27 closer to the plate 25 so that the capacitance therebetween is larger than the capacitance between diaphragm 27 and plate 26. Thus, when flip-flop 32 is reset (Q output at ground) the discharge path is through resistor R1 and the charging time constant is relatively long so that the Q output stays at ground for a longer period than it stays at its positive voltage.

When the pressure pulse is sensed diaphragm 27 deflects downwardly tending to equalize the capacity between diaphragm 27 and the two plates 25 and 26. When this occurs the waveform shown in FIG. 5B changes so that the voltage level at the Q output stays at the positive voltage level longer than at the ground level. The waveform at A is a variable pulse width waveform modulated by the value of the sensed pressure.

The waveform at A is coupled to a filter including resistor R3 and capacitor C2 which smooth the waveform as indicated at point B. This is a low-pass filter. The waveform at B is coupled to one shot multivibrator 46, and when the voltage at B reaches the required threshold voltage of multivibrator 46, the multivibrator switches to its positive state for a period of about 0.05 seconds as indicated in the bottom waveform of FIG. 5B. Multivibrator 46 may be of conventional design, and its Q output is hereinafter referred to as the digital heart output or heart beat output.

Figure 6:
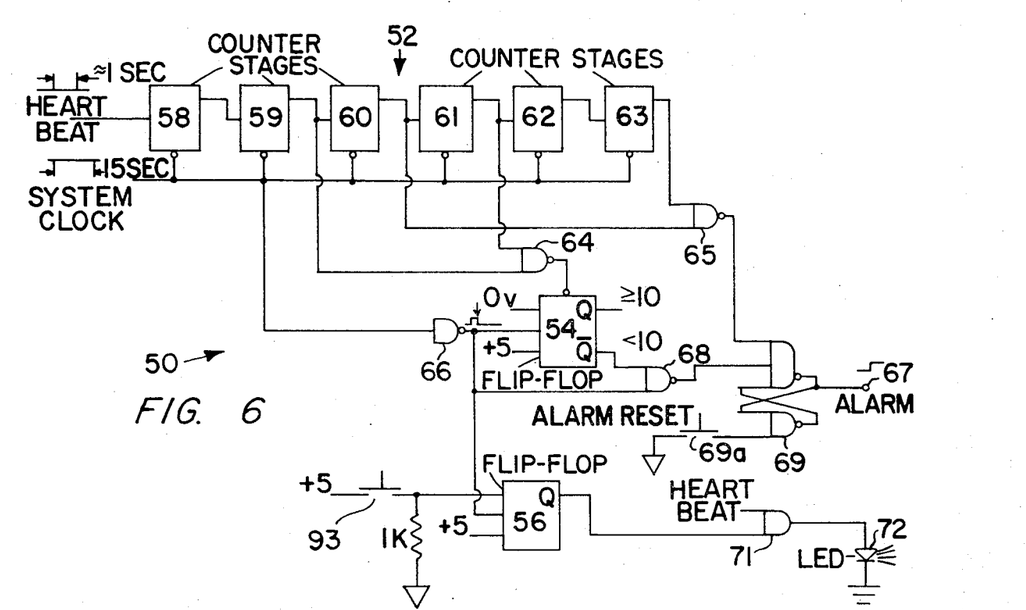
FIG. 6 is a logic block diagram illustrating one embodiment for the rate logic of FIG. 2.
Figure 7A:
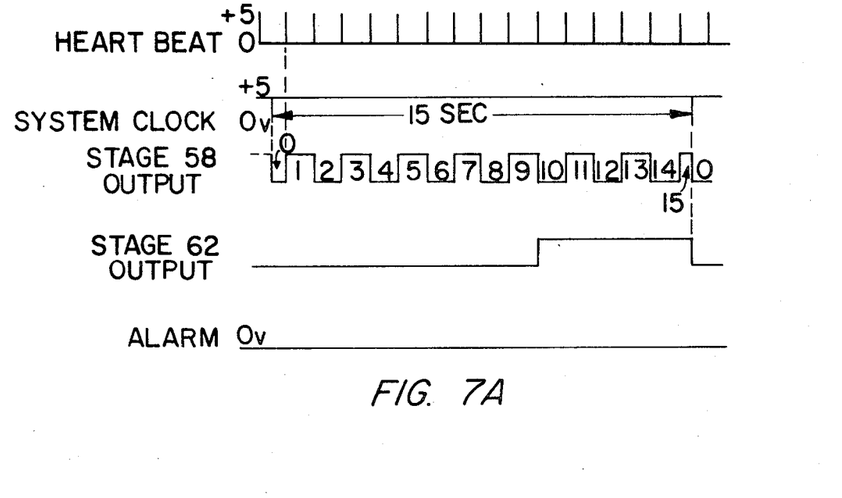
FIGS. 7A, 7B, and 7C show waveforms associated with the diagram of FIG. 6 for a no alarm condition, for a less than minimum predetermined rate alarm condition, and for a greater than maximum predetermined rate alarm condition.
Figure 7B:
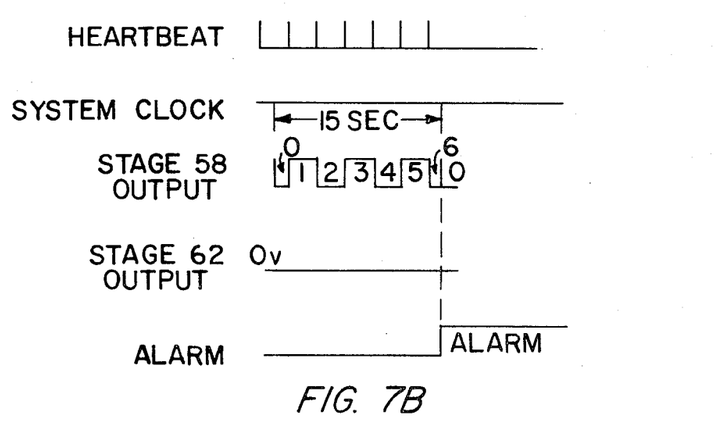
Figure 7C:
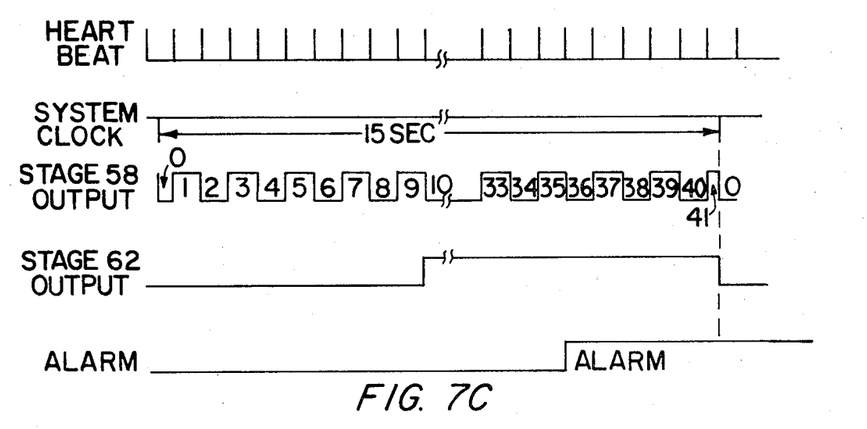

One embodiment for the rate logic 50 depicted in FIG. 2 is shown in block diagram fashion in FIG. 6. Rate logic 50 includes a six stage binary counter 52, an alarm flip-flop 54, and a light flip-flop 56. The waveforms shown in FIGS. 7A, 7B and 7C are associated with the circuitry of FIG. 6.

In the disclosed embodiment a 15 second observation time has been chosen during which digital heart pulses are received by rate logic 50. It may further be assumed that the minimum predetermined rate is 40 beats per minute and that the maximum predetermined rate is 144 beats per minute. When these maximum and minimum values are translated to a fifteen second interval their values are 10 and 36 beats, respectively, per fifteen second interval.

Figure 8A:
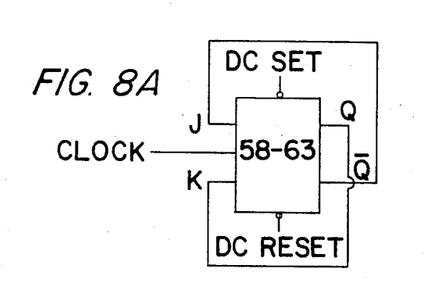
FIG. 8A shows a diagrammatic representation of a complementing flip-flop used in the diagram of FIG. 6.
Figure 8B:
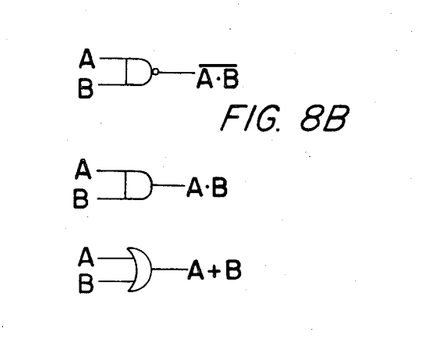
FIG. 8B shows various logic gates that may be used in the cardiac monitor.

Binary counter 52 is shown somewhat simplified, and includes stages 58–63. Each of these stages may be of the complementing flip-flop type as indicated in FIG. 8A. By connecting the Q output from each of these flip-flops to the clock input of the next flip-flop, a binary counter may be constructed. The resetting of counter 52 to all zeros is accomplished every 15 seconds by a ground going pulse of approximately 10 milliseconds duration from system clock 80. This ground pulse is coupled to all of the DC reset inputs of the stages 58–63 in order to reset counter 52 every 15 seconds and start a new count.

The digital output which has a duration of approximately 0.05 seconds is coupled to the clock input of stage 58, and each heart beat pulse that is received increments the counter 52 one count.

The outputs from counter 52 couple to two NAND gates 64 and 65. The two input connectors to gate 64 couple from the output of stage 59 and the output of stage 61. Thus, gate 64 decodes a code of 10 (2+8). The output of gate 64 couples to the DC set input of alarm flip-flop 54. An inverter 66 couples from the system clock input to the clock input of alarm flip-flop 54. A positive pulse of approximately 10 milliseconds duration is therefore impressed upon the clock input of flip-flop 54 every 15 seconds to reset the flip-flop if it has been previously set.

Referring now to FIG. 7A there are shown various waveforms for the heart beat, the 15 second system clock, the outputs of stages 58 and alarm flip-flop 54, and the condition of the alarm output 67. When ten beats are counted in less than 15 seconds the gate 64 is enabled and its output goes to ground. This action sets alarm flip-flop 54 and its $\overline{Q}$ output goes to ground. The $\overline{Q}$ output of flip-flop 54 couples to one input of NAND gate 68. The other input to NAND gate 68 is the inverted system clock which is positive going for a 10 millisecond interval every 15 seconds. Thus, when the alarm flip-flop 54 is set the gate 68 cannot be enabled and its output remains at a logical one level. This logical one level is coupled to the alarm gating 69 and keeps the output 67 at a ground level, which level is a no alarm level.

The output of gate 66, besides enabling gate 68, resets alarm flip-flop 54 every 15 seconds on its trailing (negative-going) edge.

Referring now to FIG. 7B there are shown waveforms similar to those shown in FIG. 7A for a condition where less than 10 beats are received during the 15 second interval. This should cause an alarm condition as indicated in the lower waveform of FIG. 7B. Thus, if less than 10 beats are counted during the 15 second interval, gate 64 is not enabled and alarm flip-flop 54 remains reset with its $\overline{Q}$ output at a logical one level. When the inverted system clock input to gate 68 goes positive the gate 68 is enabled and its output reverts to a logical zero level. This action enables gate 69 and the alarm output 67 goes positive. Actually, any zero logical level to gate 69 will cause an alarm condition at alarm terminal 67.

FIG. 7C shows various waveforms associated with the circuitry of FIG. 6 for a condition where more than 36 beats are detected during the 15 second observation interval. When counter 52 reaches a count of 36 gate 65 is enabled and its output which couples directly to alarm gate 69 goes to a zero voltage level thereby causing an alarm signal on terminal 67.

The alarm output at terminal 67 may be connected to a power driver (not shown) which energizes the magnetic detent holding the mechanical spring actuated alarm, and thereby produce an audible alarm similar to the alarm used in many conventional wrist alarm watches, when the signal on terminal 67 goes positive and the magnetic detent is energized and no longer holding the spring. With this type of an arrangement the alarm continues to operate even though all of the inputs to gate 69 from gates 65 and 68 revert to their logical one levels. In order to reset the alarm 67 an alarm reset push button 69a is coupled from ground to gate 69. This alarm reset switch 69a need only be a momentary contact switch. Thus, the alarm is held on by means of the output alarm latch and depressing switch 69a will cause the mechanical arm to turn off by switching on the latch.

Another feature of the present invention illustrated in FIG. 6 is provided by the circuitry including flip-flop 56 which produces a visible light pulse for each heart beat measured during a 15 second interval. Flip-flop 56 receives an inverted system clock pulse at its clock input terminal and also has an input from a +5 volt supply when switch 93 is depressed. The Q output of flip-flop 56 is normally at a logical zero level due to the +Vcc on the K input to flip-flop 56. However, when switch 93 is closed and the inverted system clock pulse is received by flip-flop 56, the Q output reverts to a logical one level and remains in that state during the next 15 seconds until the flip-flop receives the next system clock pulse. The Q output of flip-flop 56 and the digital heart beat pulse are coupled to AND gate 71. When flip-flop 56 is set and a digital heart beat pulse is received, gate 71 is enabled and current flows to light emitting diode (LED) 72 thereby causing it to flash once for each detected heart beat pulse.

Once the light emitting diode 72 starts flashing the momentary switch 93 (see FIG. 1) can be released and the flashing will continue for 15 seconds until flip-flop 56 is reset by the inverted system clock pulse thereby reverting the Q output of flip-flop 56 to its logical zero state and inhibiting gate 71. The patient may count the flashes from diode 72 and multiply by 4 to obtain his present heart rate in beats per minute. This feature provides a convenient way for the patient to check his pulse and also check the operation of the instrument. The diode 72 is quite rugged, extremely small, visible in strong light and requires only 10 milliamps from a low voltage supply and has an extremely long life span.

With the arrangement shown in FIG. 6 it is quite easy to change the low rate and high rate levels. In the example previously given the low rate was 10 and the high rate 36. However, it is quite easy to change this to different levels by connecting different outputs from counter 52 to the gates 64 and 65.

Figure 9:
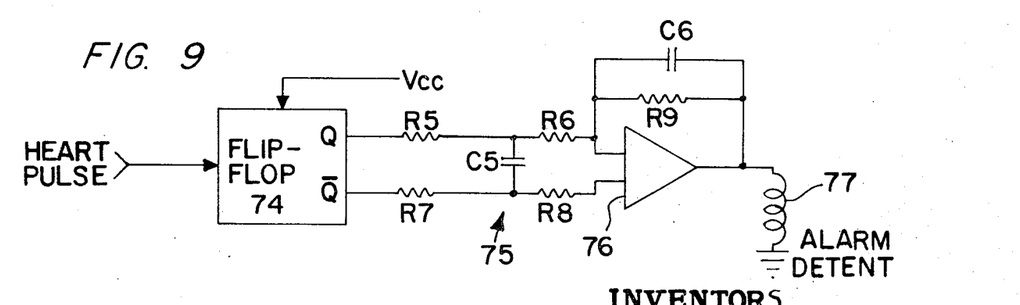
FIG. 9 is a circuit diagram of the irregularity circuitry depicted in FIG. 2.
Figure 10:
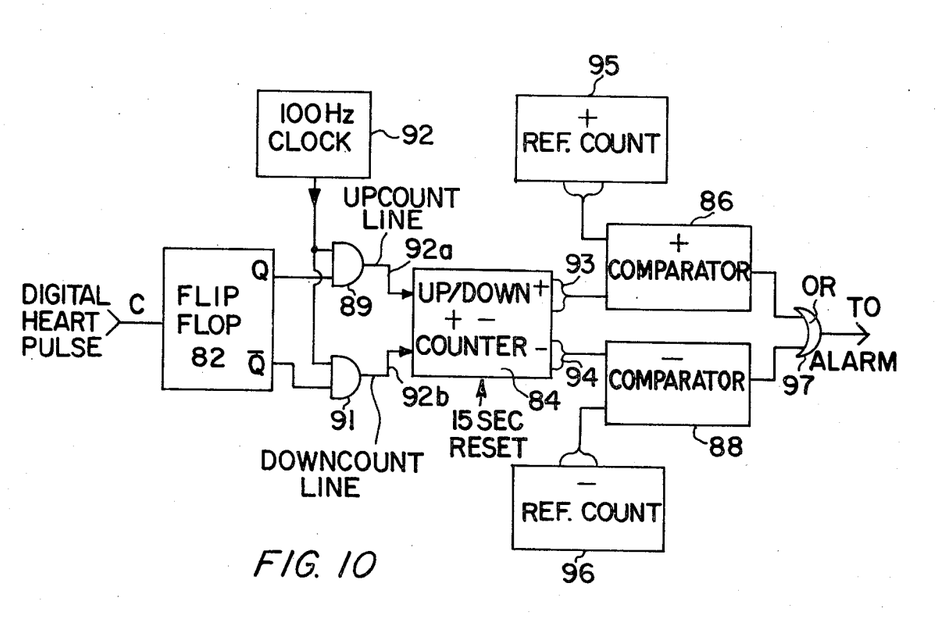
FIG. 10 is a logic block diagram for another embodiment of the irregularity circuitry of FIG. 2.

One embodiment for the irregularity circuiry 70 of FIG. 2 is shown in a circuit diagram of FIG. 9. The circuitry of FIG. 9 generally includes a complementing flip-flop 74, charging circuit 75, and output differential amplifier 76. Each digital heart pulse from multivibrator 46 is coupled to the clock input of flip-flop 74, and this flip-flop sets and resets on alternate pulses. If the input pulse is received at a constant frequency the flip-flop 74 should be in each state an equal amount of time.

Charging circuit 75 couples to the output of flip-flop 74 and includes series resistors R5 and R6 coupled from the Q output to one input of amplifier 76, and series resistors R7 and R8 coupled from the $\bar{Q}$ output to a second input of differential amplifier 76. A capacitor C5 couples across resistors R5 and R7. A capacitor C6 and resistor R9 are tied in parallel from the first input to differential amplifier 76 to the output of amplifier 76.

When a rhythmic constant frequency pulse is received the net charge across capacitor C5 should be approximately zero volts. Capacitor C5 along with resistors R5 and R7 actually form a filter having a time constant of 2 R5 C5 where R5 and R7 have equal values. In one design this time constant was approximately 30 seconds.

When an alarm condition exists, such as when the heart drops a beat, flip-flop 74 will remain in one state for a longer period than it remains in the other state. This means that capacitor C5 will be charged either positively or negatively depending upon the longer state of flip-flop 74. In either case a sufficient positive or negative charge coupled to the input of differential amplifier 76 will cause the amplifier to direct a current through alarm detent 77 which is responsive to currents in either direction. The gain of the comparator amplifier 76 is equal to R9/R6 and this value is usually low depending upon the drive requirements of the magnetic detent on the mechanical alarm. A typical closed loop gain is between 0.1 and 10 times. Capacitor C6 and resistor R9 are used to provide additional smoothing of the output and normally have a time constant on the order of 10 to 15 seconds. The value of resistor R9 may be increased to thereby increase the sensitivity of the system to arythemia, whereas decreasing the value of R9 will decrease the system sensitivity. The proper value for resistor R9 may be chosen after knowing a particular patient's condition.

Another useful feature to the circuitry of FIG. 9 is that it is essentially fail safe should the transducer become dislodged or inoperative. Under these conditions the circuit of FIG. 9 will produce a steady state output from either the Q or the $\bar{Q}$ outputs which will very rapidly charge capacitor C5 either positively or negatively. This action in turn causes an amplifier output that will energize the alarm detent 77.

Referring now to FIG. 10 there is shown a logical implementation for another embodiment of the irregularity circuit 70 of FIG. 2. The circuitry of FIG. 10 generally includes a complementing flip-flop 82, an up/down counter 84 and comparators 86 and 88. All of the circuitry shown in FIG. 10 may be of conventional design. The digital heart pulse is coupled to the clock input of flip-flop 82, and this flip-flop will alternate between its set and reset state. The Q output of flip-flop 82 couples to AND gate 89, whereas the $\bar{Q}$ output couples to AND gate 91. In this embodiment a 100 cycle per second clock is used which indirectly counts the counter 84. This clock output is coupled to the other inputs of gates 89 and 91.

Thus, when flip-flop 82 is set, gate 89 is enabled and pulses from clock 92 are passed by way of gate 89 to the up count line 92a of counter 84. Similarly, when flip-flop 82 is reset gate 91 is enabled and 100 cycle per second pulses from clock 92 are passed to down count line 92b of counter 84. The counter 84 may also be provided with an input from the system clock which resets the counter to a zero count every 15 seconds.

Counter 84 is of the type that will count up when a pulse is received on line 92a and will count down when a pulse is received on line 92b. It may be assumed that the initial count in the counter is zero. The positive output 93 of counter 84 will show a positive count when more pulses have been received on line 92a. Similarly output lines 94 will have a negative count when more pulses have been received on line 92b. Actually, the outputs 93 and 94 would include a plurality of output lines that would be coupled to comparators 86 and 88, respectively. A positive reference count block 95 and a negative reference count block 96 would have predetermined counts set therein and would have their outputs coupled to comparators 86 and 88, respectively. The output of the comparators would couple to OR gate 97 and from there to an alarm circuit which would be of conventional design. Thus, when either comparator 86 or 88 detects a sufficient positive or negative count equal to the count in blocks 95 or 96, respectively, an alarm signal is coupled via either input of OR gate 97 to the alarm.

In the foregoing exposition reference has been made to abnormalities in the functioning of the heart, such as the heart missing a beat or having a double beat. These abnormalities are common occurrences in some patents. When the heart is beating at a rate of 1 beat per second, for example, a beat is missed when the time interval between beats becomes 2 seconds or more. Similarly, a double beat may happen when two beats occur with a time interval therebetween on the order of 0.1 second, for example.

What is claimed is:

1. A cardiac monitor adapted to be attached to the body comprising:
    a pressure sensor;
    means for holding the pressure sensor against the body at an area where a pressure pulse transmitted from the heart can be detected;
    means for converting a detected pressure pulse into a representative electrical pulse;
    and circuit means for establishing an alarm condition when an abnormal pattern of successive electrical pulses is detected comprising;
    a binary counter coupled from said means for converting for counting heart pulses during a predetermined time interval,
    decode logic means coupled from said binary counter and including a first logic gate responsive to a minimum predetermined count and a second logic gate responsive to a maximum predetermined count, and means coupled from the logic gates of the decode logic means for generating an alarm condition after the predetermined time interval when the minimum predetermined count has not been attained and also when the maximum predetermined count has been exceeded.

2. A cardiac monitor adapted to be attached to the body comprising:

a pressure sensor;

means for holding the pressure sensor against the body at an area where a pressure pulse transmitted from the heart can be detected;

means for converting a detected pressure pulse into a representative electrical pulse;

and circuit means for establishing an alarm condition when an abnormal pattern of successive electrical pulses is detected comprising;

a bistable device that is set to its alternate states by successive electrical pulses and has first and second output terminals, first and second resistive means each having one end coupled, respectively, to said first and second output terminals, a capacitor coupled between the other ends of said first and second resistive means, difference circuit means coupled from said capacitor, and means for generating an alarm when the difference circuit means detects a voltage of greater than a predetermined voltage level across said capacitor.

3. The cardiac monitor of claim 2 comprising third and fourth resistive means coupling from said capacitor to respective inputs of said difference circuit means.

4. The cardiac monitor of claim 3 comprising a filter circuit coupled across said difference circuit means.

* * * * *